Aug. 19, 1958     J. P. J. SERRES     2,847,940
MEASURING PUMPS

Original Filed Jan. 4, 1951     4 Sheets-Sheet 1

INVENTOR
Jean Paul Justin
SERRES

BY
*Jewett, Mead & Browne*

ATTORNEYS

Aug. 19, 1958   J. P. J. SERRES   2,847,940
MEASURING PUMPS

Original Filed Jan. 4, 1951   4 Sheets-Sheet 2

INVENTOR
Jean Paul Justin
SERRES

BY
Jewett, Mead & Browne
ATTORNEYS

Aug. 19, 1958  J. P. J. SERRES  2,847,940
MEASURING PUMPS
Original Filed Jan. 4, 1951  4 Sheets-Sheet 3

INVENTOR
Jean Paul Justin SERRES
BY

Jewett, Jurad & Brown

ATTORNEYS

Aug. 19, 1958

J. P. J. SERRES 2,847,940

MEASURING PUMPS

Original Filed Jan. 4, 1951

INVENTOR
Jean Paul Justin SERRES

BY

Jewett, Mead & Browne

ATTORNEYS

United States Patent Office 2,847,940
Patented Aug. 19, 1958

2,847,940

MEASURING PUMPS

Jean Paul Justin Serres, Paris, France, assignor to Societe pour l'Etude et la Realisation dans l'Industrie "S. E. R. D. I.," Paris, France, a corporation of France Continuation of application Serial No. 204,293, January 4, 1951. This application July 28, 1953, Serial No. 370,698

2 Claims. (Cl. 103—38)

The present specification is a continuation of my copending application Ser. No. 204,293, now abandoned. It has for its primary object a measuring pump for delivering fluid in readily adjustable elementary volumes, the adjustment of said delivery being operated easily through external means during operation.

My invention has also for its object a measuring pump including a pump body and a piston the movement of which is controlled by a cam operating in opposition with a return spring or the like part, the return movement of the piston being limited by means of a longitudinally slidable stop, the location of which is adjustable so as to allow adjustment of the length of stroke of the piston and consequently of the volume fed by the pump per time unit.

Said adjustable stop limiting the movement of the piston may be hand-adjustable or controlled by any adjusting means in a manner such that it may consequently modify and adjust the output of the pump as a function of any variable magnitude through which said output should be controlled. On the other hand, in the case of a plurality of pumps, each pump may be controlled by a separate motor or else when it is desired to obtain a predetermined proportion between various liquid outputs, the different pumps producing said outputs may be controlled by a common power unit.

Further objects and features of the invention will appear in the following description relating to accompanying drawings that illustrate diagrammatically by way of examples and by no means in a limiting sense various embodiments of the invention. In said drawings.

Figure 8:
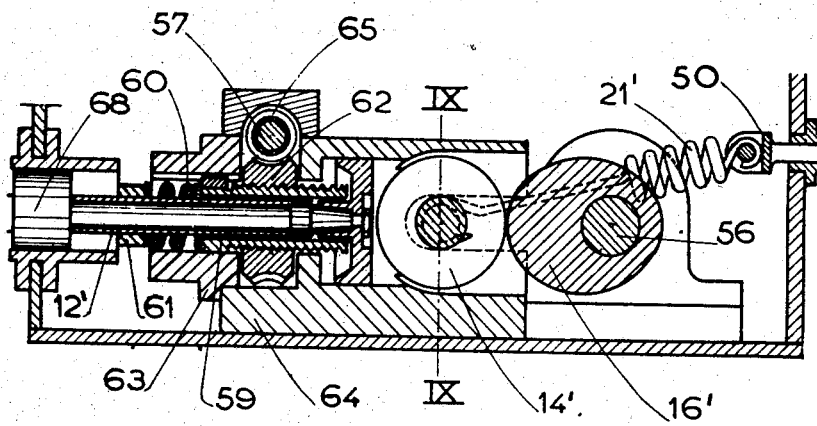
Figure 7:
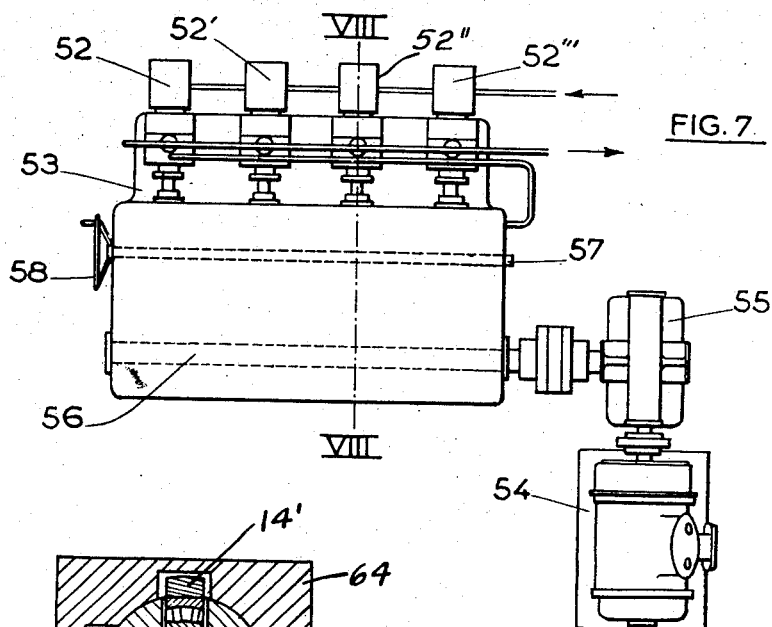
Figure 9:
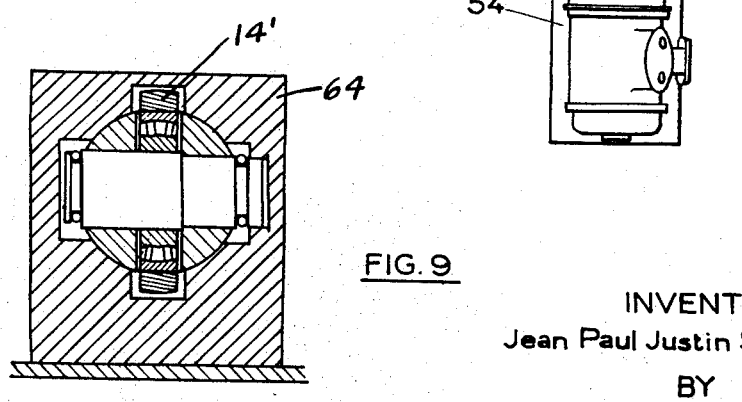

Figs. 7, 8, 9 relate to a modified embodiment incorporating a plurality of coupled pumps the operative strokes of which are adjusted simultaneously by means of a single member.

Fig. 7 is a general diagrammatic view of such an arrangement.

Fig. 8 is a cross-section through line 8—8 of Fig. 7.

Fig. 9 is a cross-section through line 9—9 of Fig. 8.

Turning more particularly to Figs. 1 to 4, 1 designates the frame of the machine carrying the pump body 2 through the agency of an open member 3.

Figure 4:
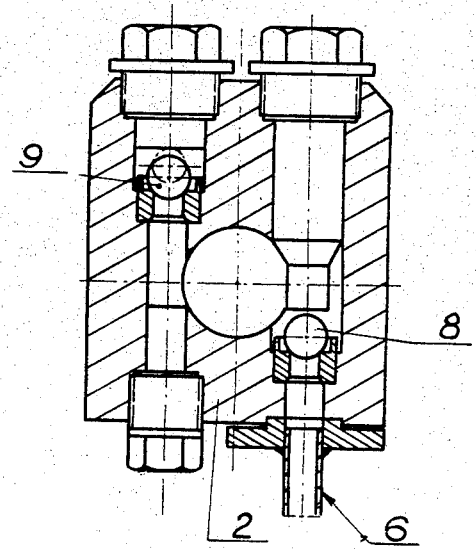
Fig. 4 is a sectional view through line IV—IV of Fig. 1.
Figure 2:
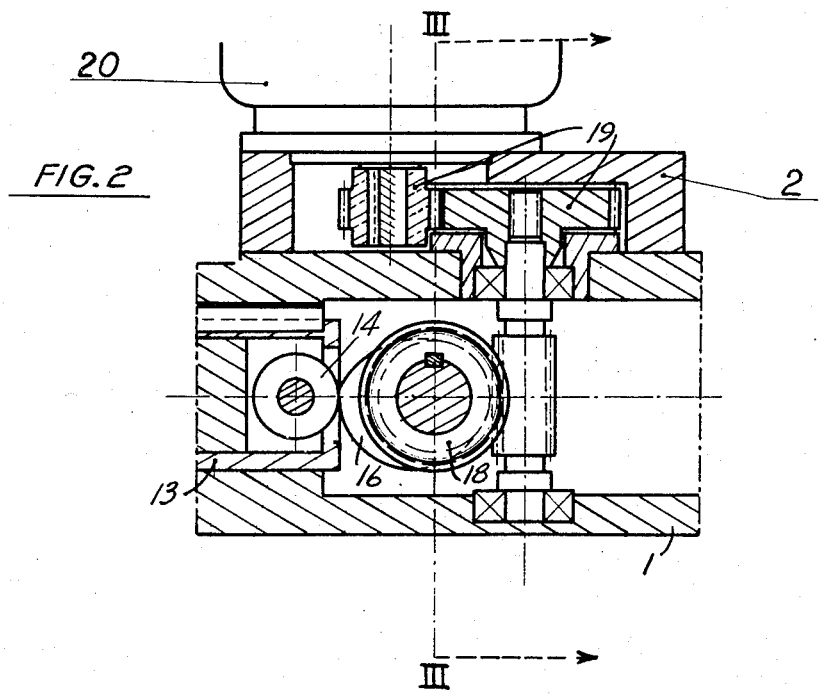
Fig. 2 is a corresponding sectional view on a larger scale of the cam-operated control means.

Inside the pump body is provided a piston 4 moving therein and provided with a lining 5 whereas, 6 and 7 designate the input and output pipes for the liquid adapted to fill the pump body while 8 and 9 as shown in Fig. 4 designate the admission and exhaust valves (Fig. 4). To the rear end of the piston is secured (Fig. 1) a stuffing box 10 that provides for the fluid tightness of the piston rod 11. As is apparent from inspection of Fig. 1, said stuffing box is readily accessible from the outside along the open connecting member 3. The rod 11 of the piston is screwed over the rod 12 carrying at its end remote from the piston a cage member 13 inside which is revolubly carried a roller 14; the system including the piston 4, the rods 11 and 12, the cage 13 and the roller 14 is adapted to assume a unitary reciprocating movement. The cage 13 is provided with grooves engaging a correspondingly grooved bore 15 in the frame 1 so as to be capable of assuming longitudinal sliding movement without being capable of rotating round its axis. Furthermore, inside the bore 15 in the frame 1 is arranged a cam 16 carried by a shaft 17 revolving in the direction of the arrows shown in Fig. 2, said shaft being driven through the agency of a wormwheel 18 and a number of gears 19 controlled by the motor 20. Said cam engages the roller 14 in a manner such as will give said roller and consequently the piston 4 a reciprocating movement for each revolution of said cam. A spring 21 engaging on one hand a member 22 carried by the frame of the machine and, on the other hand, a stop 23 on the rod 12 urges, the roller against the cam. Said cam assumes the shape illustrated in the drawings i. e. a slope that is small on one side and larger on the other whereby, during its rotary movement, said cam urges first the roller towards the left hand side of the figure at a comparatively slow speed at first for compressing the piston in the pump and as soon as said leftward movement is at an end, the cam releases speedily said roller to allow a quick shifting of the piston towards the right which produces a comparatively rough suction inside the pump body. This leads to an immediate rising of the suction valve off its seat which ensures a filling of the pump body under the best conditions of operation. Of course, the spring 21 is sized so as to allow such a sucking operation.

Figure 1:
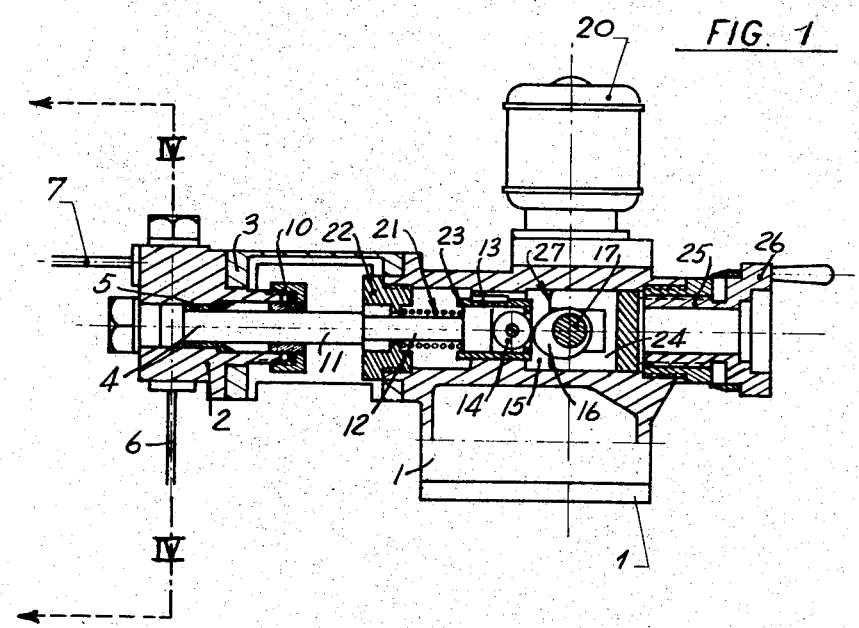
Fig. 1 is a sectional elevational view of the measuring pump arrangement according to the invention, together with the motor driving same.
Figure 3:
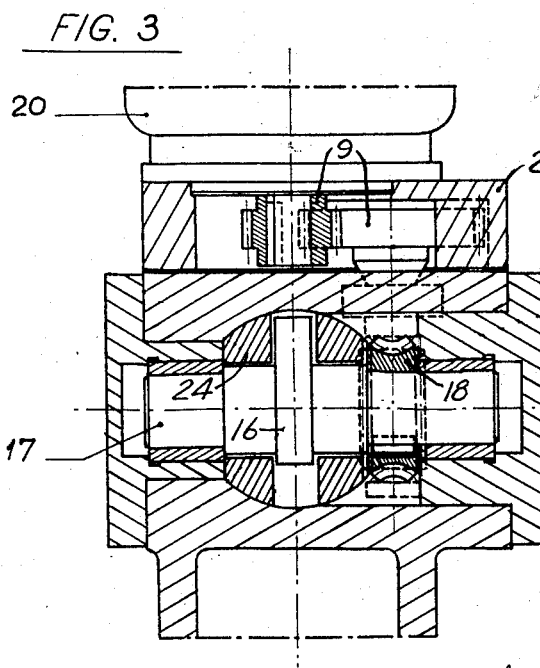
Fig. 3 is a cross-section through line III—III of Fig. 2.

To the side of the cam 16 is arranged an adjustable member 24 assuming for instance the shape illustrated in Figs. 1 and 3. Said member is capable of sliding inside the bore 15 of the frame 1 and its position is adjusted by a worm 25 screwed into the frame of the machine and the movement of which is controlled by a knurled knob 26. The location of said knurled knob is defined by a micrometric screw allowing an adjustment with the utmost accuracy of the location of the member 24 inside the bore 15. It is possible to increase the accuracy of adjustment by providing a speed reducing gear such as a sun and planet gear between the milled knob 26 and the worm 25 controlling the stop member 24. Said member 24 carries at its front end stops 27 against which the front end of the cage 13 bears when the roller 14 is no longer in contact with the cam 16 and the latter has receded inside the stop 27.

The operation of the arrangement is as follows:

During the delivery period, the cam urges through its rounded portion the roller 16 and consequently the piston 4 towards the left hand side of the figure. When the more eccentric part of the cam has come into contact with the roller, the return spring 21 begins urging towards the right the roller 14 and causes the latter to slide towards the steepest portions of the cam so that the piston is urged towards the right, which corresponds to the suction stroke, this movement continues until the cage 13 engages the adjustable stop 27 that limits the movement of said cage 13 and consequently of the piston 4 towards the right hand side. The cam continues rotating and after a certain time it returns into contact with the roller 14 and urges it again towards the left so as to produce a further delivery of the liquid out of the pump, and so on. The adjustment of the stop 27 that is performed through the micrometric screw referred to ensures a very accurate adjustment of the stroke of the piston 4 and thereby of the output of the pump at each revolution of the latter. It will be readily ascertained that the same control device may be easily connected with various types of pumps and pistons by simply replacing the removable pump body 2 on the open member 3 and the piston rod engaging the rod 12. In the case of corrosive liquids, only the piston and the pump body require to be made of special metal or alloy as the remainder of the machine is not in contact with such corrosive liquids.

On the other hand, whenever it is desired to measure beverages and the like liquids that cannot be advantageously handled in piston pumps, it is sufficient to associate a diaphragm with a pump of the type described hereinabove while any suitable control liquid would be used in a manner well known per se in the actual pump.

Figure 5:
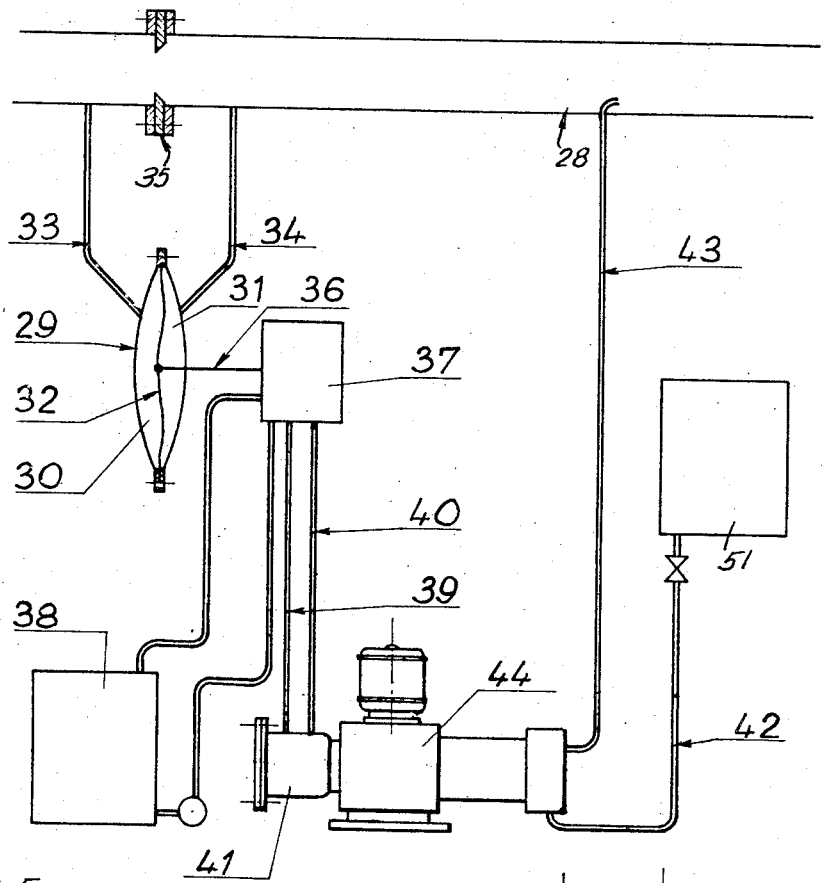
Fig. 5 is a diagram of a complete water-purifying plant incorporating a measuring pump according to the invention, said pump injecting into a water-conveying system a purifying liquid with a flow proportional to the output of the water inside the pipes of said system.
Figure 6:
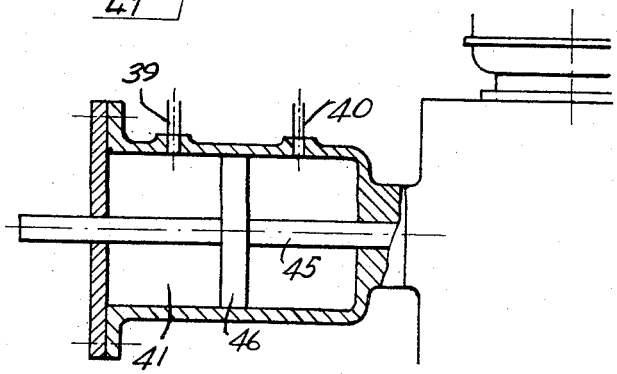
Fig. 6 is a cross-section on a larger scale of the pump-controlling means forming part of said plant.

Figs. 5 and 6 illustrate as already mentioned a water-purifying plant. In said figures, 28 designates the pipe feeding water to be purified and 29 designates an output-measuring device constituted as well known per se by a chamber subdivided into two parts 30 and 31 by a diaphragm 32, said two parts communicating through channels 33 and 34 with the pipe 38 respectively on the upstream side and on the downstream side of a throttled part 35 in said pipe. The position of the diaphragm 32 depends on the output of water passing through the pipe 28; said diaphragm acts through the agency of a rod 36 on a relay 37, acting on a pump that is not illustrated and that is adapted to inject a control liquid from a container 38 selectively through a pipe 39 and through a pipe 40 into the corresponding chambers of an auxiliary pump body 41. Said pump body is illustrated cross-sectionally on a larger scale in Fig. 6.

The problem to be solved consists in injecting into the pipe 28 a water-purifying liquid the output of which is proportional to the output of water inside the said pipe 28; the water-purifying liquid contained inside the container 51 is sucked through the pipe 42 into the body of a measuring pump 44 designed in accordance with the invention and is delivered through a pipe 43 into the pipe 28. It is desired to make the output of said measuring pump 44, executed in accordance with the invention, proportional to the throughput of water in the pipe 28 and, to this end, the stops 24–27 limiting the stroke of the piston in the measuring pump, instead of being controlled by a micrometic screw as in the case of Fig. 1, are rigid with the rod 45 of the piston 46 reciprocating inside the body of the auxiliary pump 41. When the output of water inside the pipe 28 varies, the output measuring member constituted by the diaphragm 32 acts on the relay 37 that controls in its turn the control pump so that the latter injects liquid either through the pipe 39 or through the pipe 40 into the auxiliary pump 41, whereby the piston 46 is shifted and brought into a corresponding position of equilibrium. Said piston 46 acts in its turn through the rod 45, in the manner disclosed, on the output of the measuring pump 44 in order to make its output proportional to that of the water in the pipe 28.

Figs. 7, 8 and 9 illustrate, as disclosed hereinabove an arrangement including a plurality of coupled measuring pumps whereby it is possible to adjust simultaneously the lengths of their strokes by means of a single control device.

In Fig. 7, illustrating in plan view such an arrangement of say four measuring pumps, the pump bodies are illustrated at 52, 52', 52", 52'''. These pumps are laid over a common frame 53 and are driven by a common control system 54 through the agency of a speed reduced 55 acting on a shaft 56 carrying the cams corresponding to the different pumps; said cams may be either keyed to the shaft with the same angular relationship with reference thereto or with different angular relationships, in particular when the pumps are intended for operation in parallel on the same liquid circuit so as to obtain a better uniformity for the flow and also for the instantaneous power required from the motor. In the case of four pumps e. g., said cams will be keyed at 90° with reference to one another.

In parallelism with the shaft 56 is laid a control shaft 57 adapted to provide the simultaneous adjustment of the stops of all the measuring pumps 52, 52' . . ., said shaft 56 being controlled e. g. by a handwheel 58.

In order to obtain this simultaneous adjustment in a simple manner, it is possible to resort to the arrangement illustrated cross-sectionally on a larger scale in Fig. 8. In this case, the return spring 21' urges constantly the roller 14' forwardly and consequently the piston rod 12' to the outer end of which the roller is revolubly secured in an axial plane of the said piston rod, is shifted forwardly in unison with the roller 14'. Now instead of operating under compressional conditions as in the preceding case, said return spring 21' operates against tensional stresses and is located on the side of the piston rod facing the cam 16', the spring being secured to the frame at 50. Furthermore, the stop corresponding to the stop member 27 of Fig. 1, instead of being located to the rear of the cam, is arranged in contradistinction around the rod 12 controlling the piston. The stop is thus constituted by an arrangement comprising a hollow tubular worm 59 freely slidable over the rod 12 and to which is secured a spring 60 carrying the actual stop 61. The shifting of said stop arrangement 59, 60, 61 is obtained by a nut 62 engaging the worm 59 and held against any lateral shifting longitudinally of the worm by the stationary parts 63 and 64 rigid with the frame; said nut is controlled by a transverse worm 65 carried by the general control shaft 57. The stop 61 cooperates with an abutment 68 carried by the rod 12. Similar stop arrangements are associated with the different measuring pumps 52 to 52''' and they are all controlled simultaneously by the general control shaft 57 engaging the different transverse worms such as 65. It should be remarked that the cam 16' although drawn in a highly diagrammatic manner is preferably similar in shape with that described with reference to the embodiment illustrated in Figs. 1 to 4.

It will be readily ascertained that when the general control shaft 57 is caused to rotate through the actuation of the handwheel 58, this provides for the rotation of the nut 62 that in their turn ensure a sliding of the corresponding stop arrangements 59, 60, 61. The sliding system formed by the roller 14', the rod 12', the abutment 68 and the pump piston rigid with the abutment 68 and that is not illustrated in the drawing, when it assumes a return movement under the action of the spring 21', is stopped by the contact between the parts 68 and 61, the spring 60 serving as a damper against the shocks arising through said contact between said parts 68 and 61.

Fig. 9 shows the connection between the roller 14' and the sliding system including the rod 12' associated with the piston rod.

Obviously various modifications may be brought to the arrangements disclosed without unduly widening thereby the scope of the invention as defined in accompanying claims.

What I claim is:

1. A measuring pump adapted to handle a comparatively large throughput of liquid, comprising a pump body, a piston adapted to reciprocate in said body, a rotary cam, the axis of which meets orthogonally the axis of the piston, means controlling the rotation of said cam round its axis, a member rigid with the piston controlled by said cam wherethrough said piston is urged in a predetermined direction by said cam during a first portion of the rotation of the latter, said member including a central operative surface cooperating with the cam and two abutment surfaces arranged symmetrically to either side of the plane containing the axes of the cam and of the piston, a spring urging last mentioned member into engagement with the cam, a member symmetrical with reference to the said plane and extending to either side of the said piston axis and terminating with two stops lying in a common plane perpendicular to said piston axis and symmetrical with reference to said axis, said stops for the cooperating abutment surfaces of the last-mentioned member to stop the progression of the latter and of the piston rigid therewith under the action of the spring during the further portion of the rotation of the cam away from the piston and member rigid therewith, and a handwheel coaxial with the piston and controlling the position of last mentioned member longitudinally of the piston axis with reference to the axis of rotation of the cam.

2. A measuring pump adapted to handle a comparatively large throughput of liquid, comprising a pump body, a piston adapted to reciprocate in said body, a rotary cam, the axis of which meets orthogonally the axis of the piston, means controlling the rotation of said cam round its axis, a member rigid with the piston controlled by said cam wherethrough said piston is urged in a predetermined direction by said cam during a first portion of the rotation of the latter, said member including a central operative surface cooperating with the cam and two abutment surfaces arranged symmetrically to either side of the plane containing the axes of the cam and of the piston, a spring urging last mentioned member into engagement with the cam, a member symmetrical with reference to the said plane extending across and to the rear of the side of the cam opposed to the piston and including lateral extensions terminating with two stops lying in a common plane perpendicular to said piston axis and symmetrical with reference to said axis, said stops for the cooperating abutment surfaces of the last-mentioned member to stop the progression of the latter and of the piston rigid therewith under the action of the spring during the further portion of the rotation of the cam away from the piston and member rigid therewith, and a handwheel coaxial with the piston on the side of the cam opposed to the piston and controlling the position of last mentioned member longitudinally of the piston axis with reference to the axis of rotation of the cam.

References Cited in the file of this patent
UNITED STATES PATENTS

| | | |
|---|---|---|
| 677,083 | Hollamby | June 25, 1901 |
| 1,319,857 | Edholm | Oct. 28, 1919 |
| 1,750,170 | Frisch | Mar. 11, 1930 |
| 1,930,297 | Welch | Oct. 10, 1933 |
| 2,059,145 | Richardson | Oct. 27, 1936 |
| 2,079,659 | Olin | May 11, 1937 |
| 2,126,092 | Corydon et al. | Aug. 9, 1938 |
| 2,130,521 | Brunner | Sept. 20, 1938 |
| 2,148,112 | Dillstrom | Feb. 21, 1939 |
| 2,221,179 | Buttle | Nov. 12, 1940 |
| 2,239,157 | Lowe | Apr. 22, 1941 |
| 2,282,562 | Cole | May 12, 1942 |
| 2,415,419 | Cozzoli | Feb. 11, 1947 |
| 2,540,328 | Gray | Feb. 6, 1951 |
| 2,564,793 | Seter | Aug. 21, 1951 |
| 2,599,195 | Nemetz | June 3, 1952 |
| 2,612,839 | Denny | Oct. 7, 1952 |
| 2,696,785 | Blue | Dec. 14, 1954 |
| 2,727,466 | Kling et al. | Dec. 20, 1955 |